United States Patent
Rahrig et al.

(10) Patent No.: US 11,718,403 B2
(45) Date of Patent: Aug. 8, 2023

(54) EXTREMELY QUIET SHORT TAKE-OFF AND LANDING (STOL) AIRCRAFT

(71) Applicant: Northrop Grumman Systems Corporation, Falls Church, VA (US)

(72) Inventors: Kyle Rahrig, El Segundo, CA (US); Geoffrey Sommer, El Segundo, CA (US); Barnaby S. Wainfan, Long Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 728 days.

(21) Appl. No.: 14/687,277

(22) Filed: Apr. 15, 2015

(65) Prior Publication Data
US 2016/0318606 A1    Nov. 3, 2016

(51) Int. Cl.
*B64C 39/06* (2006.01)
*B64C 11/00* (2006.01)
(Continued)

(52) U.S. Cl.
CPC .......... *B64C 39/066* (2013.01); *B64C 11/001* (2013.01); *B64C 15/14* (2013.01);
(Continued)

(58) Field of Classification Search
CPC ........ B64D 35/00; B64D 35/08; B64D 29/02; B64C 11/00; B64C 11/001; B64C 15/14; B64C 39/066
See application file for complete search history.

(56) References Cited

U.S. PATENT DOCUMENTS 3,123,321 A * 3/1964 Custer .................. B64C 39/066
244/12.6
4,629,147 A   12/1986 Johnson, Jr. et al.
(Continued)

FOREIGN PATENT DOCUMENTS

CN   1439573   9/2003
CN   102120491   7/2011
(Continued)

OTHER PUBLICATIONS

Muller, L. et al; Installation Effects of a Propeller Over a Wing with Internally Blown Flap; 30th AIAA Applied Aerodynamics Conference Jun. 25-28, 2012, New Orleans, Louisiana; 2012; American Institute of Aeronautics and Astronautics.
(Continued)

*Primary Examiner* — Assres H Woldemaryam
*Assistant Examiner* — Aaron M Rodziwicz
(74) *Attorney, Agent, or Firm* — McCracken & Gillen LLC

(57) ABSTRACT

An extremely quiet short take-off and landing (STOL) aircraft includes: two wings, wherein each wing comprises an engine system; a fuselage structurally connected to each wing; and a ducted fan thruster positioned on the fuselage in an orientation that is rotated relative to the typical orientation on a helicopter. An extremely quiet STOL aircraft includes: two wings, wherein each wing comprises an engine system; a fuselage structurally connected to each wing; channel shrouds surrounding at least one of the engine systems; and a ducted fan thruster positioned on the fuselage. An extremely quiet STOL aircraft includes: two wings, wherein each wing comprises an engine system, the engine system comprising two engine dual packs; a fuselage structurally connected to each wing; and a ducted fan thruster positioned on the fuselage.

13 Claims, 4 Drawing Sheets

(51) Int. Cl.
  *B64D 29/02* (2006.01)
  *F02K 1/34* (2006.01)
  *B64C 15/14* (2006.01)
  *B64D 35/08* (2006.01)

(52) U.S. Cl.
  CPC .............. *B64D 29/02* (2013.01); *B64D 33/06* (2013.01); *B64D 35/08* (2013.01); *Y02T 50/40* (2013.01); *Y02T 50/60* (2013.01)

(56) References Cited

U.S. PATENT DOCUMENTS

| | | | | |
|---|---|---|---|---|
| 5,082,204 | A * | 1/1992 | Croston | B64C 39/066 244/126 |
| 5,167,118 | A * | 12/1992 | Torkelson | F02K 1/827 181/213 |
| 5,320,305 | A | 6/1994 | Oatway et al. | |
| 5,597,137 | A * | 1/1997 | Skoglun | B64C 29/0033 244/12.4 |
| 7,212,641 | B2 | 5/2007 | Sheplak et al. | |
| 7,270,030 | B1 | 9/2007 | Belloso | |
| 8,777,560 | B2 | 7/2014 | Gerard et al. | |
| 9,156,550 | B2 * | 10/2015 | Nam | B64C 37/00 |
| 2005/0029396 | A1 * | 2/2005 | Englar | B64C 3/141 244/12.6 |
| 2006/0202083 | A1 * | 9/2006 | Milde, Jr. | B64C 3/385 244/12.6 |
| 2008/0006739 | A1 * | 1/2008 | Mochida | B64C 27/04 244/60 |
| 2009/0056309 | A1 * | 3/2009 | Roberge | F02C 3/113 60/263 |
| 2009/0218438 | A1 | 9/2009 | Milde, Jr. | |
| 2010/0140389 | A1 | 6/2010 | Gleed et al. | |
| 2012/0111994 | A1 | 5/2012 | Kummer et al. | |
| 2012/0153242 | A1 * | 6/2012 | Le Bonte | B29C 44/1228 252/606 |
| 2013/0164488 | A1 | 6/2013 | Wood et al. | |

FOREIGN PATENT DOCUMENTS

| | | | |
|---|---|---|---|
| CN | 103770937 | 5/2014 | |
| EP | 2730501 | 5/2014 | |
| WO | 2004065208 | 8/2004 | |
| WO | WO 2009069109 A2 * | 6/2009 | ............... B64C 3/32 |

OTHER PUBLICATIONS

Muller, L. et al; Aerodynamic Installation Effects of an Over-the-Wing Propeller on a High-Lift Configuration; Journal of Aircraft, vol. 51, No. 1 (2014); pp. 249-258.

Englar, R. et al; Pneumatic Channel Wing Powered-Lift Advanced SuperSTOL Aircraft; 1st Flow Control Conference, AIAA, Jun. 24-26, 2002; AIAA 2002-3275.

Gaeta, R. et al; Development of Pneumatic Over-the-Wing Powered-Lift Technology Part II: Aeroacoustics; 27th AIAA Applied Aerodynamics Conference Jun. 22-25, 2009; San Antonio, Texas; 2009; AIAA 2009-3941.

Hlavacek, D.; Methods of Ducted Fan Aircraft Propulsion Unit Noise Prediction; Technical Transactions, Czech Technical University in Prague (2013); Mechanics 1-M/2013.

Dugan, D. C.; Thrust Control of VTOL Aircraft Part Deux; Decennial AHS Aeromechanics Specialists' Conference 5th; Jan. 22-24, 2014; San Francisco, CA; United States.

* cited by examiner

EXTREMELY QUIET SHORT TAKE-OFF AND LANDING (STOL) AIRCRAFT

SUMMARY

An extremely quiet short take-off and landing (STOL) aircraft includes: two wings, wherein each wing comprises an engine system; a fuselage structurally connected to each wing; and a fenestron positioned on the fuselage in an orientation that is rotated relative to the typical orientation on a helicopter.

An extremely quiet STOL aircraft includes: two wings, wherein each wing comprises an engine system; a fuselage structurally connected to each wing; channel shrouds surrounding at least one of the engine systems; and a fenestron positioned on the fuselage.

An extremely quiet STOL aircraft includes: two wings, wherein each wing comprises an engine system, the engine system comprising two engine dual packs; a fuselage structurally connected to each wing; and a fenestron positioned on the fuselage.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

DETAILED DESCRIPTION

Figure 1:
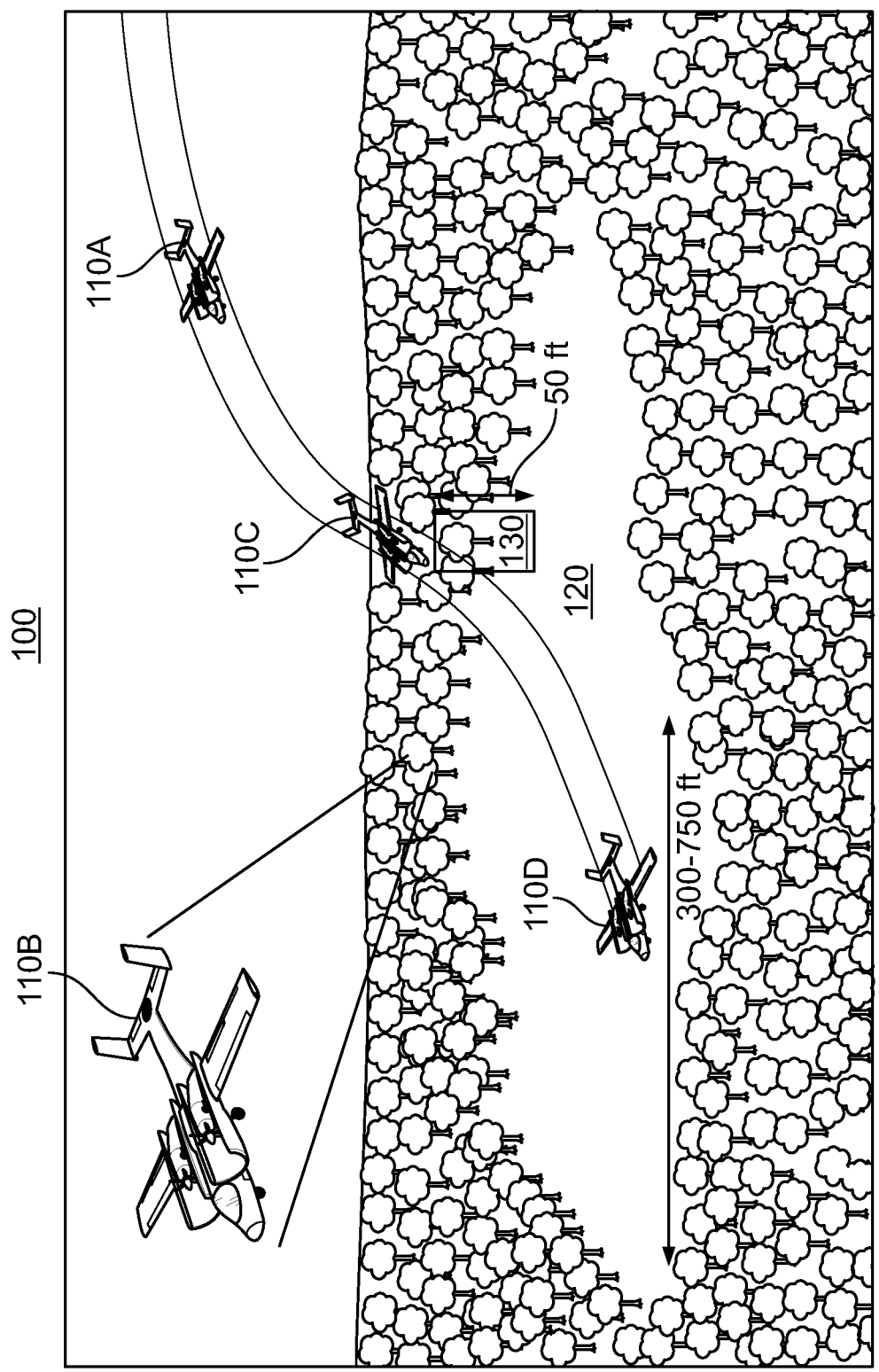
FIG. 1 is a drawing of an extremely quiet short take-off and landing (STOL) aircraft landing in an ultra-short take-off and landing zone.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

FIG. 1 is a drawing of an extremely quiet short take-off and landing (STOL) aircraft landing in an ultra-short take-off and landing zone.

FIG. 1 shows a scene 100 that depicts the extremely quiet STOL aircraft 110A as it approaches a landing zone substantially inaudibly. Ingress and egress of the extremely quiet STOL aircraft 110A are both substantially inaudible. The extremely quiet STOL aircraft 110A achieves its extremely quiet ingress and egress by leveraging one or more of its acoustic shielding schemes and the STOL capability of its channel wing design. The extremely quiet STOL aircraft 110B is a blown up figure showing the same STOL aircraft 110A in more detail. Later in time, the extremely quiet STOL aircraft 110C descends.

A bit later in time, the extremely quiet STOL aircraft 110D lands in ultra-short takeoff and landing zone 120. For example, the ultra-short takeoff and landing zone 120 comprises an unprepared field. Typically, the extremely quiet STOL aircraft 110A-110D can land in the ultra-short takeoff and landing zone 120 even if required to clear an obstacle 130 of up to approximately fifty feet in height. The extremely quiet STOL aircraft 110A-110D can also take off from the ultra-short takeoff and landing zone 120 even if required to clear the obstacle 130 of up to approximately fifty feet in height. For example, a ship may comprise the ultra-short takeoff and landing zone 120.

A representative radius of operation for the extremely quiet STOL aircraft comprises approximately 500 nautical miles. The representative velocity of the extremely quiet STOL aircraft on takeoff is approximately fifty knots.

A representative payload for the extremely quiet STOL aircraft is between approximately 2,000 pounds and approximately 3,000 pounds. This representative payload can, for example, accommodate two pilots at an estimated weight of approximately 250 pounds each, 4-6 troops including gear at an estimated weight with gear of approximately 300 lbs. per troop, and sensor(s) with an estimated total weight of approximately 200 pounds to approximately 500 pounds.

Figure 2:
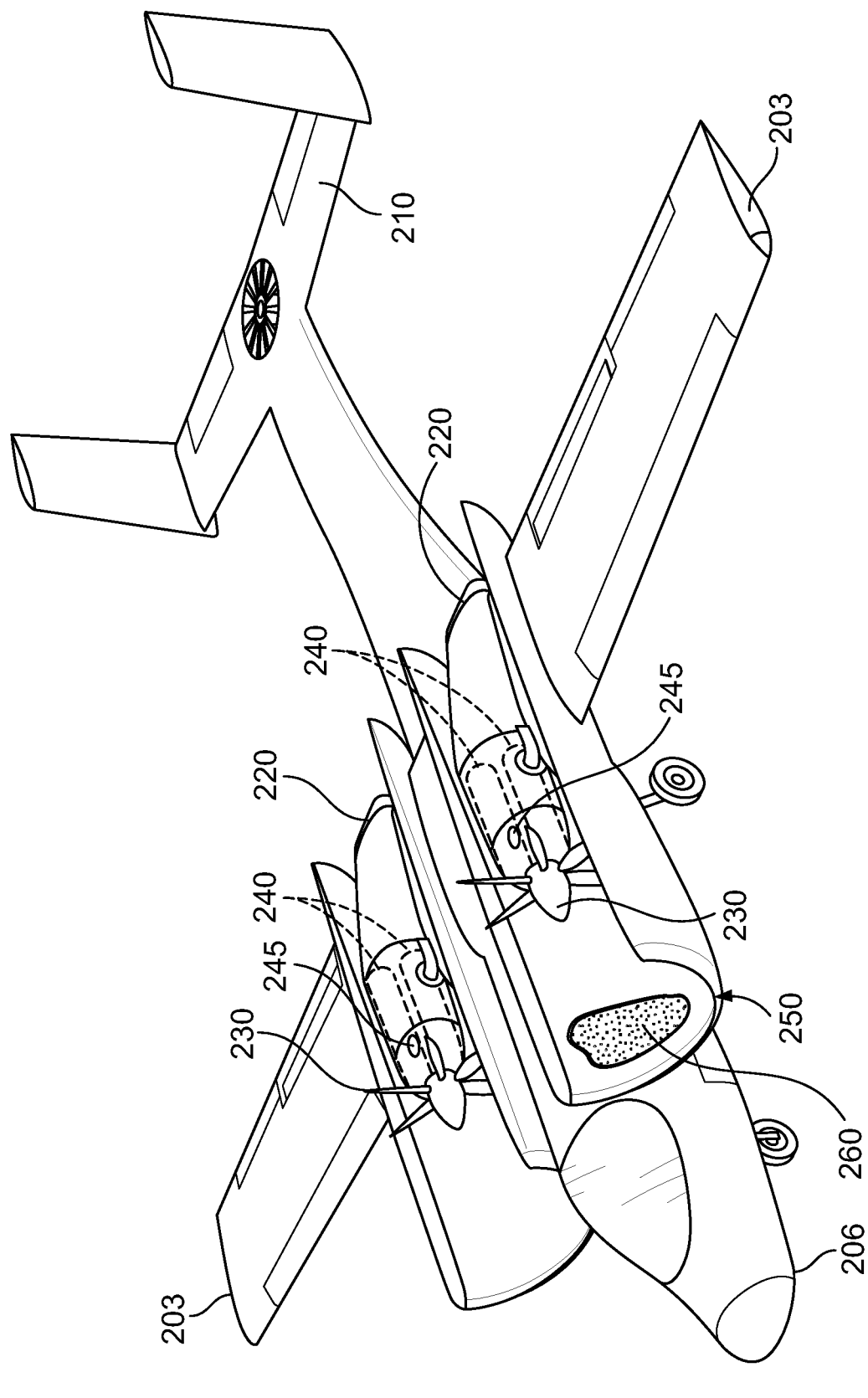
FIG. 2 is a drawing of a perspective view of an extremely quiet STOL aircraft.

FIG. 2 is a drawing of a perspective view of an extremely quiet STOL aircraft 110. The extremely quiet STOL aircraft 110 comprises wings 203, a fuselage 206, and a fenestron 210 or tail fan 210. The fenestron 210 resembles the fenestron used in helicopters. Here, however, the fenestron 210 is rotated by approximately ninety degrees relative to the typical orientation on a helicopter. For example, the fenestron may be an electrically driven fenestron. The fenestron 210 is configured to function as a lift fan in order to control pitch at low speeds, thereby facilitating control of the extremely quiet STOL aircraft 110 without air flow over a control surface being required. The fenestron 210 is used during one or more of the approach and take-off phases, and consequently requires little power.

The wings 203 comprise an innovative engine system. Each wing 203 comprises an engine system 220 on that side driving a propeller 230 on that side. Preferably, although not necessarily, the engine system 220 comprises an engine dual pack 220. One or more of the propellers 230 are acoustically tailored propellers 230. The chord-wise location of the propellers 230 minimizes their associated acoustic signature and maximizes acoustic shielding of radiated acoustic energy.

Each engine dual pack 220 comprises two engines 240. On each side, the two engines are combined through a combining gearbox onto one shaft driving a single propeller. For example, the extremely quiet STOL aircraft comprises two Soloy dual pack PT6D-114A engines, manufactured by Soloy Aviation Solutions of Olympia, Wash. (www.soloy.com).

Preferably, though not necessarily, the two engines 240 on a given side will be substantially interchangeable. Preferably, although not necessarily, all four engines 240 are substantially interchangeable. Therefore, if one engine 240 stops working or otherwise malfunctions, this does not affect the functionality of the invention. Even if one engine 240 on each side stops working or otherwise malfunctions, the functionality of the invention is not affected. Also, it is possible to use the two extra engines for significantly increased electrical power when not needed for landing or takeoff.

The engine dual pack 220 further comprises a dual pack exhaust port 245 configured to expel engine exhaust. Preferably, the dual pack exhaust port 245 is located on or near the top of the extremely quiet STOL aircraft 110. This positioning of the dual pack exhaust port 245 further reduces noise.

The extremely quiet STOL aircraft 110 further comprises at least one innovative channel shroud 250 surrounding at least one of the engine dual systems 220. Preferably, although not necessarily, the channel shrouds 250 may be substantially U-shaped. Preferably, although not necessarily, the channel shrouds 250 are approximately hemi-cylindrical in order to save weight while providing acoustic shielding. The channel shrouds 250 are elongated to provide enhanced noise shielding.

The channel shrouds 250 hemi-cylindrically surround the lower half of the propellers 230. The channel shrouds 250 are internally filled with sound attenuating material 260 to provide acoustic shielding.

The sound attenuating material 260 may be optimized for transmission loss. The sound attenuating material 260 may be fixed to the channel shrouds 250. For example, the sound attenuating material 260 may be glued to the channel shrouds 250. For example, the sound attenuating material 260 may provide a density gradient favorable for low-frequency acoustic energy attenuation. For example, the channel shrouds 250 are internally filled with foam 260 that is loaded with one or more of metal and another dense material.

At typical flight altitudes, the propellers 230 are obscured by the channel shrouds 250 and thus a large percentage of the acoustic energy is reflected upwards rather than to the ground. Moreover, the high velocity air flow over the channeled portion of the wing provides lift, particularly at low airspeed to facilitate STOL.

Figure 3:
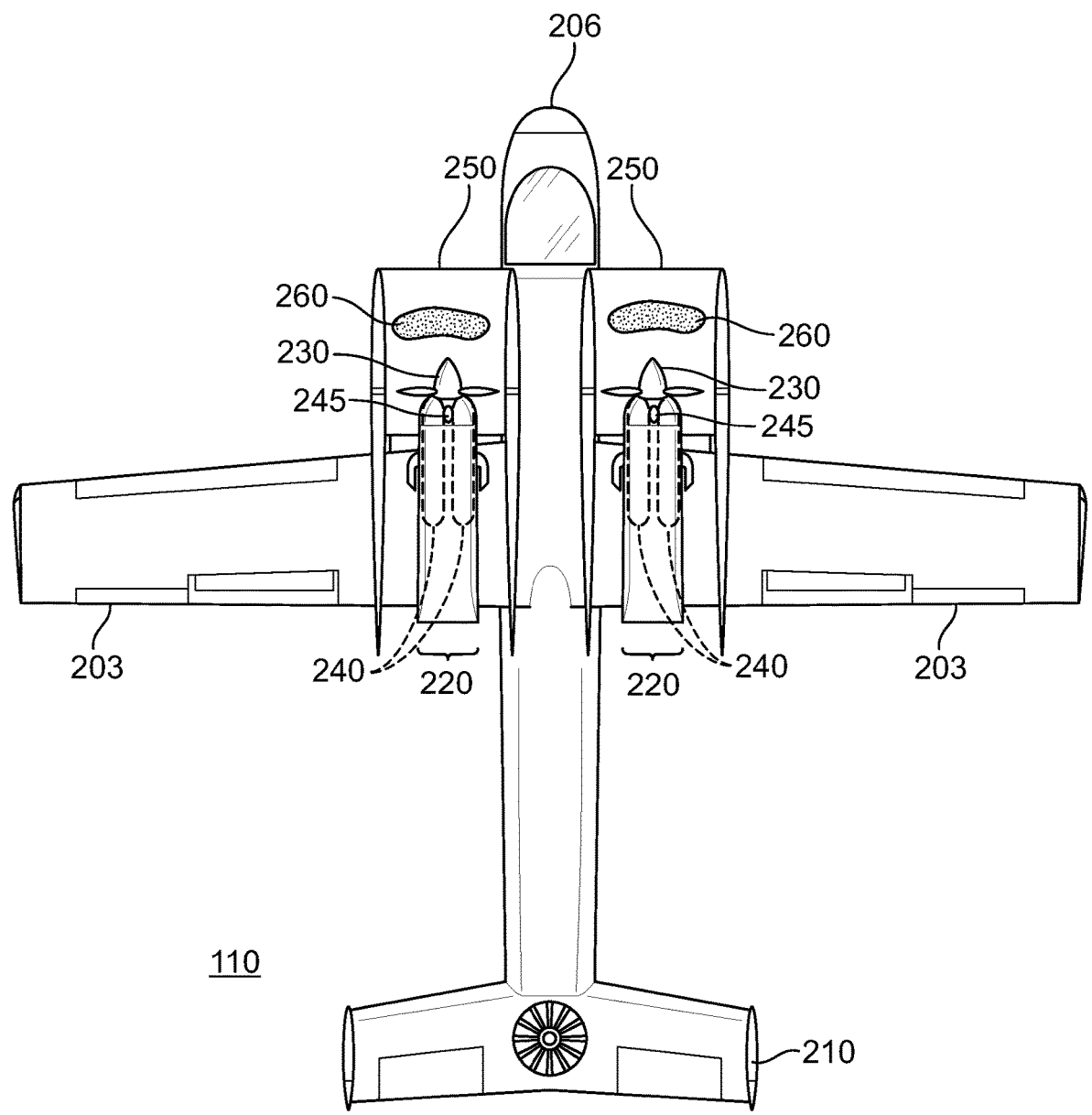
FIG. 3 is a drawing of a top view of an extremely quiet STOL aircraft.

FIG. 3 is a drawing of a top view of an extremely quiet STOL aircraft comprising wings 203, the fuselage 206, the ducted fan thruster 210, the engine dual packs 220, the propellers 230, the engines 240, the dual pack exhaust ports 245, the channel shrouds 250, and the sound attenuating material 260.

Figure 4:
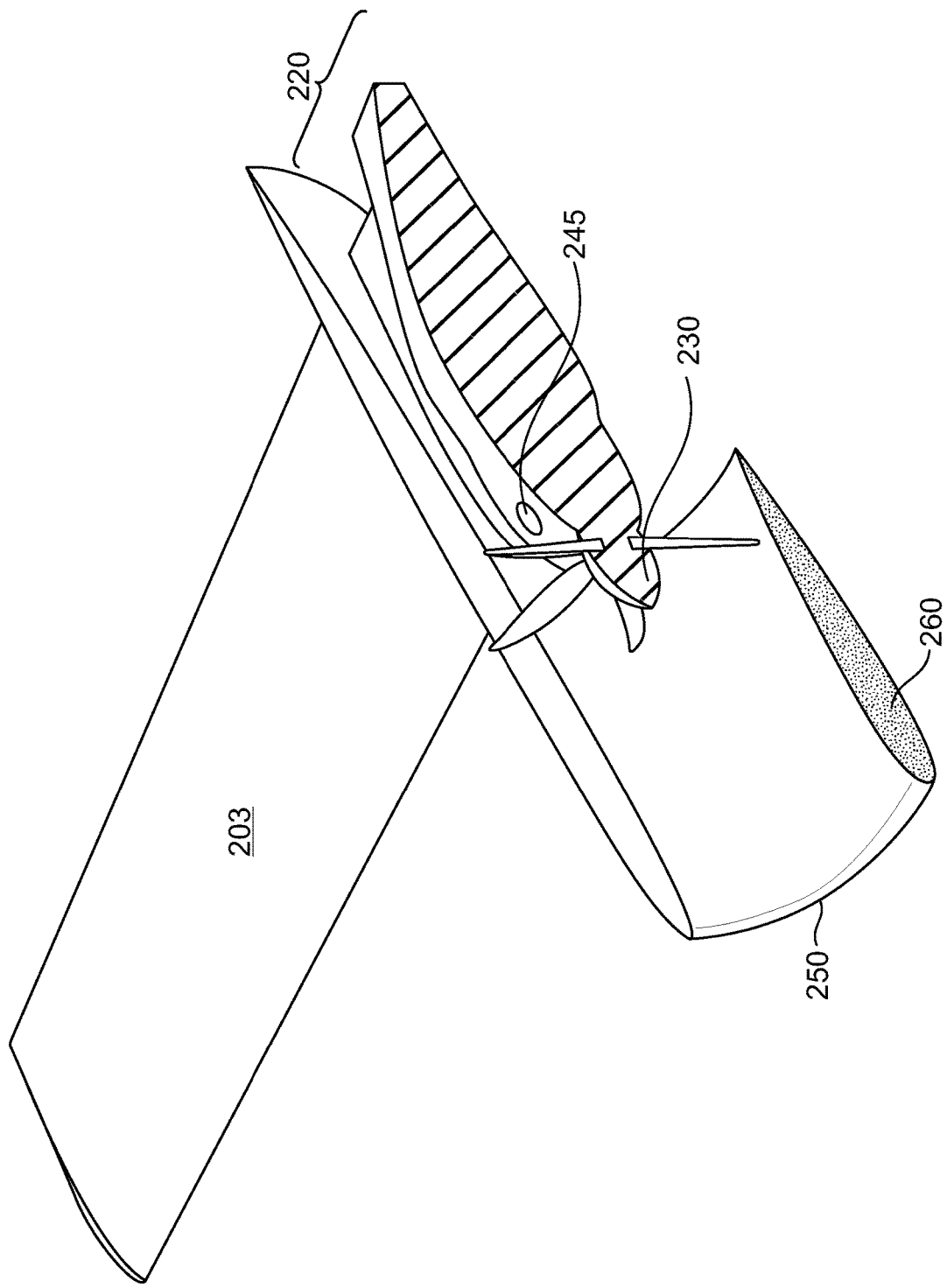
FIG. 4 is a drawing of a top view of components of an extremely quiet STOL aircraft.

FIG. 4 is a drawing of a top view of components of an extremely quiet STOL aircraft comprising the wing 203, the engine dual packs 220, the propeller 230, the engines 240, the dual pack exhaust port 245, the channel shroud 250, and the sound attenuating material 260.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain fabrication steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

We claim:

1. A short take-off and landing (STOL) aircraft comprising:
two wings,
wherein each wing comprises an engine system;
a fuselage structurally connected to each wing;
channel shrouds surrounding at least one of the engine systems, at least one of the channel shrouds filled with a sound attenuating material, at least one of the channel shrouds providing lift to the STOL aircraft, at least one of the channel shrouds reflecting acoustic energy upwards, at least one of the channel shrouds being elongated to provide enhanced noise shielding, the engine systems driving a propeller, the channel shrouds located outside the fuselage, wherein the channel shrouds hemi-cylindrically surround a lower half of the propeller, the propeller located at a longitudinal center of the channel shrouds, wherein a chord-wise location of the propellers minimizes an associated acoustic signature and maximizes acoustic shielding of radiated acoustic energy; and
a ducted fan thruster positioned on the fuselage in an orientation that is rotated relative to the typical orientation of a main rotor on a helicopter, wherein the STOL aircraft is configured to approach a landing zone substantially inaudibly, wherein ingress and egress of the STOL aircraft are both substantially inaudible, wherein the STOL aircraft is configured to do one or more of land in an ultra-short takeoff and landing zone and take off from the ultra-short takeoff and landing zone even if required to clear an obstacle of up to approximately fifty feet in height, wherein a representative radius of operation for the STOL aircraft comprises approximately 500 nautical miles, wherein a representative velocity of the STOL aircraft on takeoff is approximately fifty knots, wherein a representative payload for the STOL aircraft is between approximately 2,000 pounds and approximately 3,000 pounds.

2. The STOL aircraft of claim 1, wherein:
the engine system comprises two engine dual packs, one engine dual pack located on either side of the extremely quiet STOL aircraft.

3. The STOL aircraft of claim 2, wherein:
each of the engine dual packs comprises two engines.

4. The STOL aircraft of claim 3, wherein:
the two engines in an engine dual pack are combined through a combining gearbox.

5. The STOL aircraft of claim 4, wherein:
the two engines in the engine dual pack are combined onto one shaft driving a single propeller.

6. The STOL aircraft of claim 4, wherein:
the four engines in the extremely quiet STOL aircraft are substantially interchangeable.

7. The STOL aircraft of claim 3, wherein:
the two engines in the engine dual pack are substantially interchangeable.

8. The STOL aircraft of claim 3, wherein:
one of the two engines in the engine dual pack is configured to provide electrical power when not used for one or more of landing and takeoff.

9. The STOL aircraft of claim 2, wherein:
both of the engine dual packs of the extremely quiet STOL aircraft drive a propeller located on the side of the aircraft on which the engine dual pack is located.

10. The STOL aircraft of claim 2, wherein:
at least one of the engine dual packs further comprises a dual pack exhaust port configured to expel engine exhaust.

11. The STOL aircraft of claim 10, wherein:
the dual pack exhaust port is located on the top of the extremely quiet STOL aircraft.

12. The STOL aircraft of claim 1, wherein:
the ducted fan thruster is positioned at an angle of approximately ninety degrees relative to the typical orientation of the main rotor on a helicopter.

13. The STOL aircraft of claim 1, wherein the ducted fan thruster is configured to function as a lift fan in order to control pitch at low speeds, thereby facilitating control of the STOL aircraft without air flow over a control surface being required.

* * * * *